(12) United States Patent
Aoyagi et al.

(10) Patent No.: US 7,106,539 B2
(45) Date of Patent: Sep. 12, 2006

(54) PERPENDICULAR MAGNETIC RECORDING APPARATUS

(75) Inventors: Yuka Aoyagi, Tachikawa (JP); Tsutomu Tanaka, Ome (JP); Kenji Shimizu, Ichihara (JP); Akira Sakawaki, Ichihara (JP)

(73) Assignees: Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/168,997

(22) Filed: Jun. 29, 2005

(65) Prior Publication Data

US 2006/0001996 A1 Jan. 5, 2006

(30) Foreign Application Priority Data

Jun. 30, 2004 (JP) .............................. 2004-193168

(51) Int. Cl.
*G11B 15/18* (2006.01)
(52) U.S. Cl. ....................................................... 360/71
(58) Field of Classification Search ............... None
See application file for complete search history.

(56) References Cited

U.S. PATENT DOCUMENTS

| 4,621,030 | A | 11/1986 | Uesaka et al. |
| 6,395,388 | B1 | 5/2002 | Iwasaki et al. |
| 6,636,390 | B1 * | 10/2003 | Funayama et al. ......... 360/317 |
| 6,645,646 | B1 | 11/2003 | Umeda et al. |
| 6,710,984 | B1 | 3/2004 | Yuasa et al. |
| 6,723,457 | B1 | 4/2004 | Tanahashi et al. |
| 6,777,113 | B1 | 8/2004 | Trindade et al. |
| 6,785,097 | B1 * | 8/2004 | Okada et al. ............... 360/317 |
| 2002/0028357 | A1 | 3/2002 | Shukh et al. |
| 2002/0136930 | A1 | 9/2002 | Oikawa et al. |
| 2003/0035973 | A1 | 2/2003 | Trindade et al. |
| 2003/0099869 | A1 | 5/2003 | Oikawa et al. |
| 2003/0175556 | A1 | 9/2003 | Sakawaki et al. |

FOREIGN PATENT DOCUMENTS

| JP | 06-103553 | 4/1994 |
| JP | 2001-155321 | 6/2001 |
| JP | 2003-162807 A | 6/2003 |
| JP | 2003-317212 A | 11/2003 |

OTHER PUBLICATIONS

Australian Search Report dated Apr. 28, 2006 for Singapore Appln. No. 200503937.5.

\* cited by examiner

*Primary Examiner*—K. Wong
(74) *Attorney, Agent, or Firm*—Pillsbury Winthrop Shaw Pittman, LLP (57) ABSTRACT

A perpendicular magnetic recording apparatus includes a perpendicular double-layered media having a substrate, a soft underlayer including a soft magnetic layer, an intermediate layer, and another soft magnetic layer in which the two soft magnetic layers are antiferromagnetically coupled with each other, and a perpendicular recording layer, and a magnetic head including a main pole, a return yoke, and an exciting coil. A relationship between an antiferromagnetic coupling force Hex_afc of the two soft magnetic layers included in the soft underlayer and a full width at half maximum MWW in a cross track direction when a low-frequency signal is recorded on the perpendicular recording layer by the magnetic head satisfies the following formula:

$$Hex\_afc > 1.6 * \ln((0.23 - MWW)^2 * 100)) + 25.6.$$

13 Claims, 6 Drawing Sheets

PERPENDICULAR MAGNETIC RECORDING APPARATUS

CROSS-REFERENCE TO RELATED APPLICATIONS

This application is based upon and claims the benefit of priority from prior Japanese Patent Application No. 2004-193168, filed Jun. 30, 2004, the entire contents of which are incorporated herein by reference.

BACKGROUND OF THE INVENTION

1. Field of the Invention

The present invention relates to a perpendicular magnetic recording apparatus.

2. Description of the Related Art

A perpendicular magnetic recording apparatus has a perpendicular double-layered media including a soft underlayer and a perpendicular recording layer, and a magnetic head (single pole head) including a main pole, a return yoke, and an exciting coil, and records data by using magnetic coupling between the magnetic head and the soft underlayer. Since the soft underlayer of the perpendicular double-layered media can be regarded as a part of the magnetic head, it is necessary to stabilize magnetization in the soft underlayer and reduce noise from the soft underlayer.

Magnetization of the soft underlayer is stabilized by using a structure pinning the magnetization of the soft underlayer in one direction in which the soft underlayer is formed on a magnetization pinning layer. For example, a perpendicular magnetic recording media is proposed in which an in-plane hard magnetic layer, an intermediate layer, an in-plane soft magnetic layer, and a perpendicular recording layer are stacked on a substrate, and the intermediate layer is a magnetic layer having saturation magnetization smaller than that of the in-plane hard magnetic layer, a nonmagnetic layer having a thickness smaller than 0.5 nm, or an oxide layer of the in-plane hard magnetic layer (Jpn. Pat. Appln. KOKAI Publication No. 2003-162807). In this perpendicular magnetic recording media, magnetization deviation caused by an external magnetic field is suppressed, and media noise is reduced.

Also, as described above, in the perpendicular magnetic recording apparatus using the perpendicular double-layered media and the single pole head, data is recorded by using the magnetic coupling between the single pole head and the perpendicular double-layered media, i.e., a flow of magnetic flux from the main pole to the return yoke through the soft underlayer. Therefore, miserase of information recorded on the media readily occurs due to remanent magnetization in the main pole. To solve this problem, a method which prevents miserase by reducing the remanent magnetization in the main pole after recording by modifying the shape of the main pole is proposed (Jpn. Pat. Appln. KOKAI Publication No. 2003-317212). However, as the track density (TPI) of the perpendicular recording media increases, the size of the main pole decreases. For example, to realize 200 kTPI, a track width of 0.13 µm or less is necessary. Therefore, the main pole is made into a needle-like shape and becomes magnetically unstable. This makes it difficult to reduce the remanent magnetization and prevent miserase only by modifying the shape of the main pole. In addition, when the track width of the main pole decreases, the field strength of the main pole also decreases. This makes it difficult to maintain the recording quality.

Furthermore, hard disk drives are incorporated in car navigation systems and household electric appliances as well as in personal computers, and are beginning to be used in wide temperature environments accordingly. Especially because a magnetic recording media changes its coercivity in accordance with the use temperature, recording characteristics at room temperature, high temperatures, and low temperatures may also be different. Therefore, hard disk drives are required to be able to write and read data without any problems in wide temperature environments from low temperatures to high temperatures. More specifically, it is necessary to maintain high thermal fluctuation resistance and good fringe characteristics at high temperatures, and maintain high overwrite characteristics and a high S/N ratio at low temperatures.

BRIEF SUMMARY OF THE INVENTION

A perpendicular magnetic recording apparatus according to an aspect of the present invention comprises a perpendicular double-layered media comprising a substrate, a soft underlayer including a soft magnetic layer, an intermediate layer and another soft magnetic layer in which the two soft magnetic layers are antiferromagnetically coupled with each other, and a perpendicular recording layer; and a magnetic head comprising a main pole, a return yoke, and an exciting coil, wherein a relationship between an antiferromagnetic coupling force Hex_afc of the two soft magnetic layers included in the soft underlayer and a full width at half maximum MWW in a cross track direction when a low-frequency signal is recorded on the perpendicular recording layer by the magnetic head satisfies the following formula:

$$Hex\_afc > 1.6 * \ln((0.23 - MWW)^2 * 100)) + 25.6.$$

A perpendicular magnetic recording apparatus according to another aspect of the present invention comprises a perpendicular double-layered media comprising a substrate, a soft underlayer including a soft magnetic layer, an antiferromagnetic layer and another soft magnetic layer in which each soft magnetic layer and the antiferromagnetic layer are coupled with each other by exchange coupling, and the two soft magnetic layers are not coupled, and a perpendicular recording layer; and a magnetic head comprising a main pole, a return yoke, and an exciting coil, wherein a relationship between an exchange coupling force Hex_sw between the soft magnetic layers and the antiferromagnetic layer included in the soft underlayer and a full width at half maximum MWW in a cross track direction when a low-frequency signal is recorded on the perpendicular recording layer by the magnetic head satisfies the following formula:

$$Hex\_sw > 1.6 * \ln((0.23 - MWW)^2 * 100)) + 25.6.$$

DETAILED DESCRIPTION OF THE INVENTION

Embodiments of the present invention will be described below with reference to the accompanying drawings.

Figure 1:
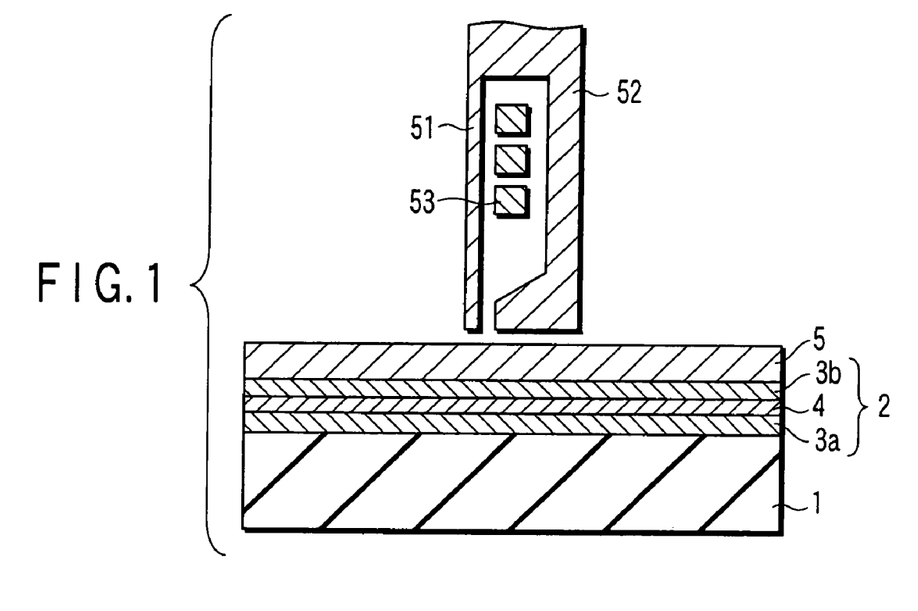
FIG. 1 is a sectional view showing a perpendicular magnetic recording apparatus according to the first embodiment of the present invention.

FIG. 1 shows a perpendicular magnetic recording apparatus according to the first embodiment of the present invention. This perpendicular magnetic recording apparatus includes a perpendicular magnetic recording media (perpendicular double-layered media) and a magnetic head. The perpendicular double-layered media shown in FIG. 1 has a structure in which a soft underlayer 2 including a soft magnetic layer 3a, an intermediate layer 4 and another soft magnetic layer 3b, and a perpendicular recording layer 5 are stacked on a nonmagnetic substrate 1. The magnetic head shown in FIG. 1 is a recording head called a single pole head, and includes a main pole 51, a return yoke 52, and an exciting coil 53.

The soft magnetic layers 3a and 3b are made of a soft magnetic material having high permeability. Examples are CoZrNb, FeTaC, FeZrN, an FeSi alloy, an FeAl alloy, an FeNi alloy such as permalloy, an FeCo-based alloy such as Permendur, an FeCoNi alloy such as Perminvar, an NiCo alloy, sendust, MnZn-based ferrite, MgMn-based ferrite, MgZn-based ferrite, FeAlGa, FeCuNbSiB, FeGaGe, FeGeSi, FeSiC, FeZrB, FeZrBCu, CoFeSiB, CoTi, and CoZrTa.

The intermediate layer 4 is formed of Ru or the like. The two soft magnetic layers 3a and 3b included in the soft underlayer 2 are antiferromagnetically coupled with each other through the intermediate layer 4.

Perpendicular magnetic recording media of modifications of FIG. 1 will be described below with reference to FIGS. 2 to 5.

Figure 2:
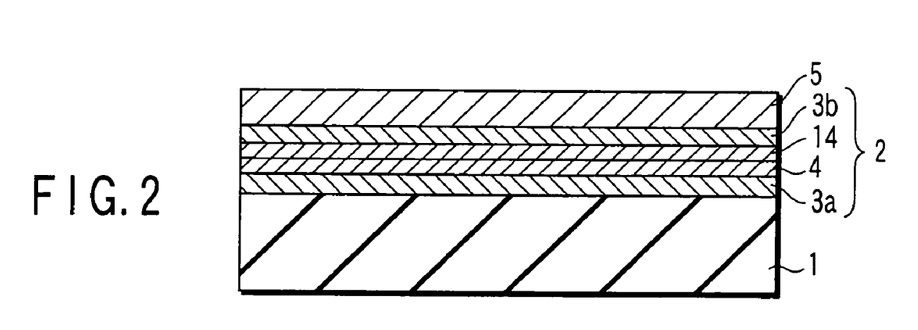
FIG. 2 is a sectional view showing a perpendicular magnetic recording media as a modification of FIG. 1.

A perpendicular magnetic recording media shown in FIG. 2 has a structure in which a soft underlayer 2 including a soft magnetic layer 3a, an intermediate layer 4, a second intermediate layer 14 and another soft magnetic layer 3b, and a perpendicular recording layer 5 are stacked on a nonmagnetic substrate 1. Ru or the like is used for the intermediate layer 4, and Co or the like is used for the second intermediate layer 14. The antiferromagnetic coupling between the two soft magnetic layers 3a and 3b can be enhanced by the stack of the intermediate layer 4 made of Ru and the second intermediate layer 14 made of Co.

Figure 3:
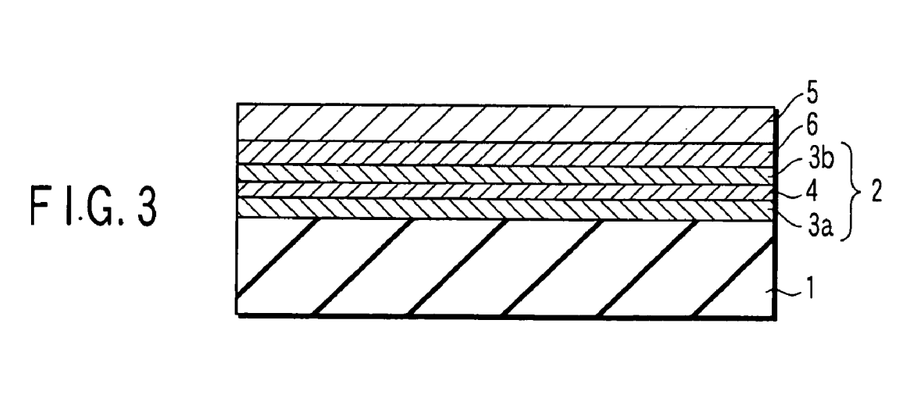
FIG. 3 is a sectional view showing a perpendicular magnetic recording media as a modification of FIG. 1.

A perpendicular magnetic recording media shown in FIG. 3 has a structure in which a soft underlayer 2 including a soft magnetic layer 3a, an intermediate layer 4 and another soft magnetic layer 3b, a nonmagnetic underlayer 6, and a perpendicular recording layer 5 are stacked on a nonmagnetic substrate 1. The perpendicular magnetic recording media shown in FIG. 3 differs from that shown in FIG. 1 in that the nonmagnetic underlayer 6 is formed between the soft underlayer 2 and perpendicular recording layer 5. The media noise can be reduced by use of the nonmagnetic underlayer 6.

Figure 4:
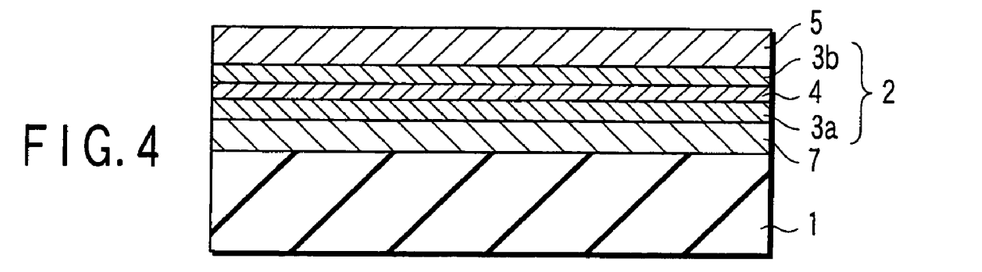
FIG. 4 is a sectional view showing a perpendicular magnetic recording media as a modification of FIG. 1.

A perpendicular magnetic recording media shown in FIG. 4 has a structure in which an in-plane hard magnetic layer 7 as a magnetization pinning layer, a soft underlayer 2 including a soft magnetic layer 3a, an intermediate layer 4 and another soft magnetic layer 3b, and a perpendicular recording layer 5 are stacked on a nonmagnetic substrate 1. The perpendicular magnetic recording media shown in FIG. 4 differs from that shown in FIG. 1 in that the in-plane hard magnetic layer 7 as a magnetization pinning layer is formed between the substrate 1 and the soft underlayer 2. CoCrPtB, CoSm, CoPt, or the like is used for the in-plane hard magnetic layer 7. Magnetization of the soft underlayer 2 can be stabilized by forming the in-plane hard magnetic layer 7 as a magnetization pinning layer for the soft underlayer 2.

Figure 5:
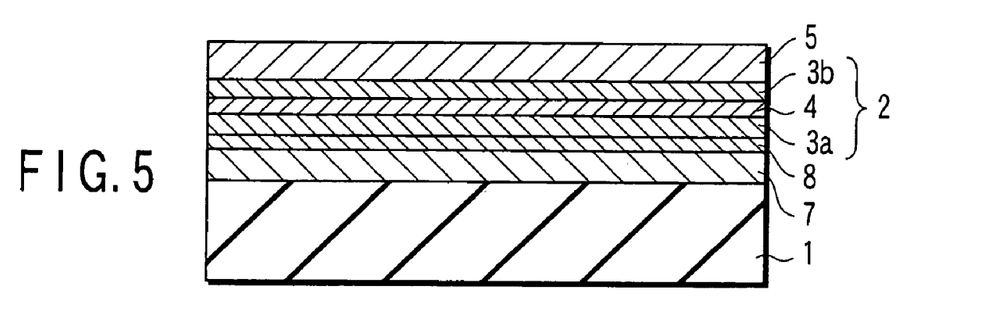
FIG. 5 is a sectional view showing a perpendicular magnetic recording media as a modification of FIG. 1.

A perpendicular magnetic recording media shown in FIG. 5 has a structure in which an in-plane hard magnetic layer 7 as a magnetization pinning layer, a magnetic or nonmagnetic layer 8 having saturation magnetization smaller than that of the in-plane hard magnetic layer 7, a soft underlayer 2 including a soft magnetic layer 3a, an intermediate layer 4 and another soft magnetic layer 3b, and a perpendicular recording layer 5 are stacked on a nonmagnetic substrate 1. The perpendicular magnetic recording media shown in FIG. 5 is obtained by forming the magnetic or nonmagnetic layer 8 having saturation magnetization smaller than that of the in-plane hard magnetic layer 7 between the in-plane hard magnetic layer 7 and the soft underlayer 2 in the perpendicular magnetic recording media shown in FIG. 4. Magnetization of the soft underlayer 2 can be further stabilized by the magnetic or nonmagnetic layer 8.

It is also possible to use a perpendicular magnetic recording media obtained by appropriately combining the second interlayer 14, the nonmagnetic underlayer 6, the in-plane hard magnetic layer 7, and the magnetic layer 8 shown in FIGS. 2 to 5.

Figure 6:
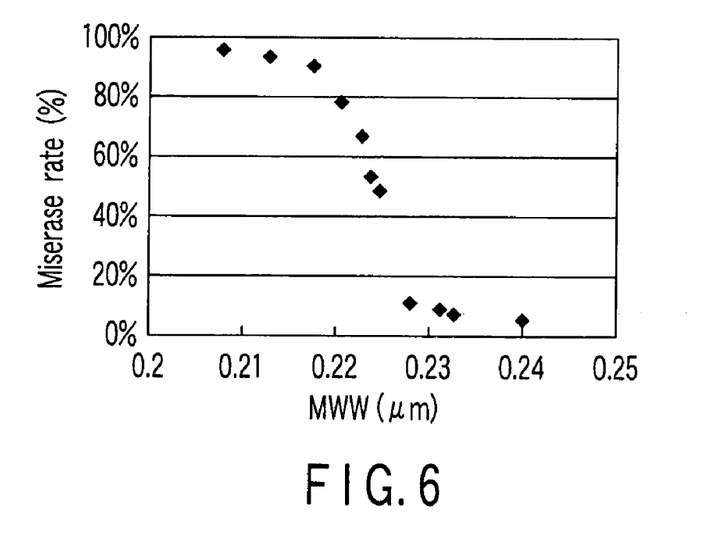
FIG. 6 is a graph showing the relationship between the MWW and miserase rate.

As the size of the main pole decreases, the miserase rate of information recorded on the perpendicular recording media increases due to remanent magnetization in the main pole. This will be explained below on the basis of data. FIG. 6 shows the relationship between the MWW and miserase rate. The MWW is equivalent to a track width recorded on the perpendicular recording layer by the main pole of the recording head, and related to the physical track width of the main pole. The MWW is determined as a full width at half maximum in the cross track direction when a low-frequency signal is recorded on the perpendicular recording layer by the magnetic head. A miserase rate of 0% indicates that no miserase occurs in any sectors, and a 100% recording operation is ensured. In contrast, a miserase rate of 100% indicates that miserase occurs in all sectors. FIG. 6 shows that when the MWW becomes smaller than 0.225 μm, the miserase rate abruptly rises. Accordingly, to reduce the miserase rate against the future reduction in MWW, it is necessary not only to improve the magnetic head but also to improve the magnetic recording media.

As described earlier, hard disk drives are incorporated in car navigation systems and household electric appliances as well as in personal computers, so the use temperature range is widened from low temperatures to high temperatures. Therefore, there are two requirements, that is, (1) to maintain a high thermal fluctuation resistance and good fringe characteristics at high temperatures, and (2) to maintain high overwrite characteristics and a high S/N ratio at low temperatures.

Figure 7:
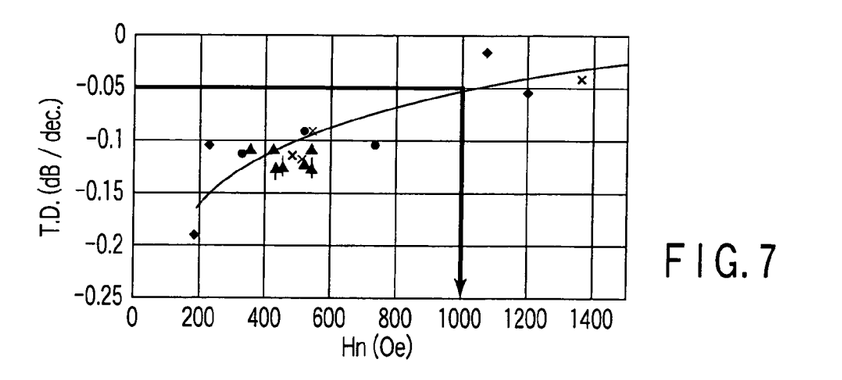
FIG. 7 is a graph showing the relationship between an absolute value of a nucleation field Hn at which magnetization reversal starts and a thermal fluctuation resistance TD of a media.

FIG. 7 shows the relationship between an absolute value of a nucleation field Hn (Oe) at which magnetization reversal of the media starts and the dependence of signal output deterioration upon time, i.e., a thermal fluctuation resistance TD (dB/decade). FIG. 7 shows that the media need only have an Hn of 1 kOe or more in order to maintain a thermal fluctuation resistance higher than 0.05 dB/dec. Furthermore, since the Hn of the media at high temperatures is lower than that at room temperature, the Hn at room temperature is desirably made 1.2 kOe or more in order to maintain a high thermal fluctuation resistance even at high temperatures.

Figure 8:
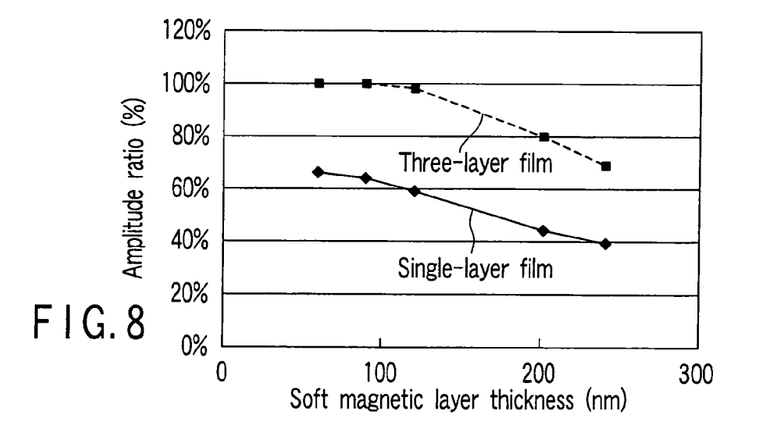
FIG. 8 is a graph showing the relationship between the thickness of soft magnetic layers included in a soft underlayer and the fringe characteristics.

FIG. 8 shows the relationship between the thickness of the soft magnetic layers included in the soft underlayer and the fringe characteristics. The fringe characteristics indicate the ratio of the amplitude of an on-track signal measured after data is recorded on an adjacent track 10,000 times relative to the amplitude of an initial on-track signal. Accordingly, an amplitude ratio of 100% means that there is no amplitude deterioration.

When a single-layer film of CoZrNb [240 nm] was used as the soft underlayer, the amplitude ratio was 40%. When a single-layer film of CoZrNb [120 nm] was used as the soft underlayer, the amplitude ratio was 60%.

By contrast, when a three-layer film (FIG. 1) of CoZrNb [60 nm]/Ru/CoZrNb [60 nm] (the total thickness of the soft magnetic layers was 120 nm) was used as the soft underlayer, the amplitude ratio greatly increased to 98%. Also, when a three-layer film of CoZrNb [45 nm]/Ru/CoZrNb [45 nm] (the total thickness of the soft magnetic layers was 90 nm) was used as the soft underlayer, almost no amplitude deterioration was found. As described above, the fringe characteristics can be improved by using the soft underlayer in which the two soft magnetic layers sandwiching the intermediate layer (in this case, Ru) are antiferromagnetically coupled, instead of a single-layer soft underlayer.

Figure 9:
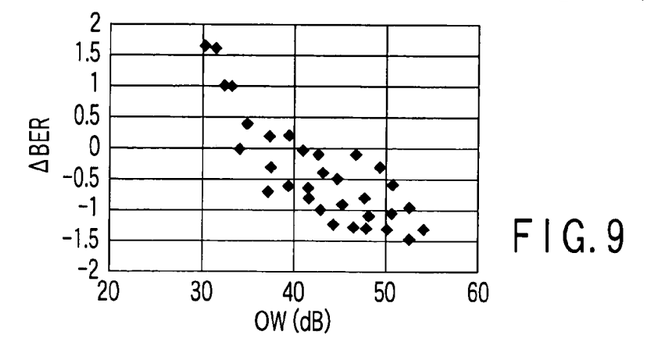
FIG. 9 is a graph showing the relationship between the overwrite characteristics (OW) and the bit error rate (BER)

FIG. 9 shows the relationship between the overwrite characteristics (OW) and bit error rate (BER). The overwrite characteristics indicate a value related to the quality of recording. In perpendicular magnetic recording, to write low-frequency signals is more difficult than to write high-frequency signals. Therefore, a value which represents, in dB, unerased high-frequency signals obtained when low-frequency signals are overwritten after the high-frequency signals are written is used as an index of the overwrite characteristics. The overwrite characteristics OW are desirably as high as possible, because if the overwrite characteristics OW are deteriorated, the BER is also deteriorated.

Figure 10:
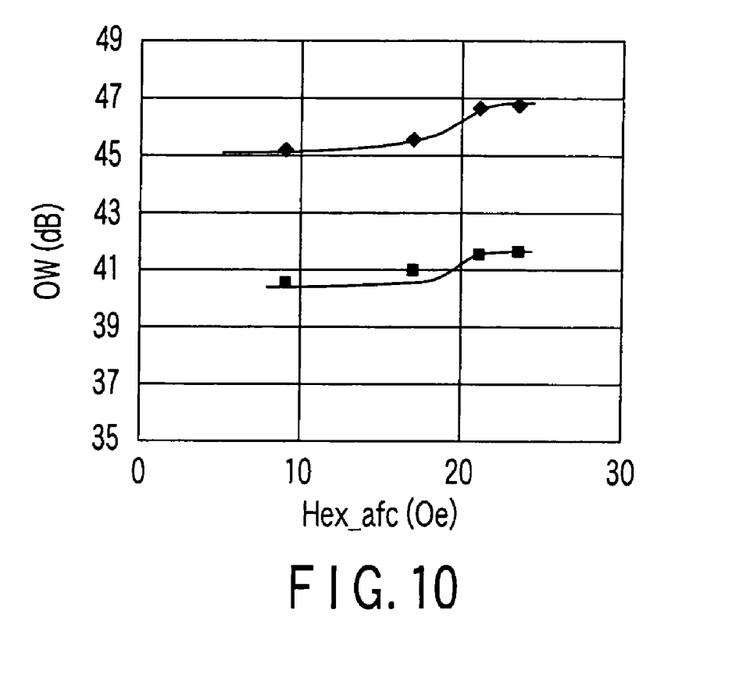
FIG. 10 is a graph showing the relationship between an antiferromagnetic coupling force Hex_afc of a soft underlayer and the overwrite characteristics OW.

FIG. 10 shows the relationship between an antiferromagnetic coupling force Hex_afc of the soft underlayer and the overwrite characteristics OW. Compared to a three-layer film of CoZrNb/Ru/CoZrNb, a four-layer film (FIG. 2) of CoZrNb/Ru/Co/CoZrNb in which very thin Co is sandwiched as a second intermediate layer on Ru can increase the antiferromagnetic coupling force, and thereby making it possible to improve the overwrite characteristics. A similar effect can also be obtained by a four-layer film of CoZrNb/Co/Ru/CoZrNb.

Figure 11:
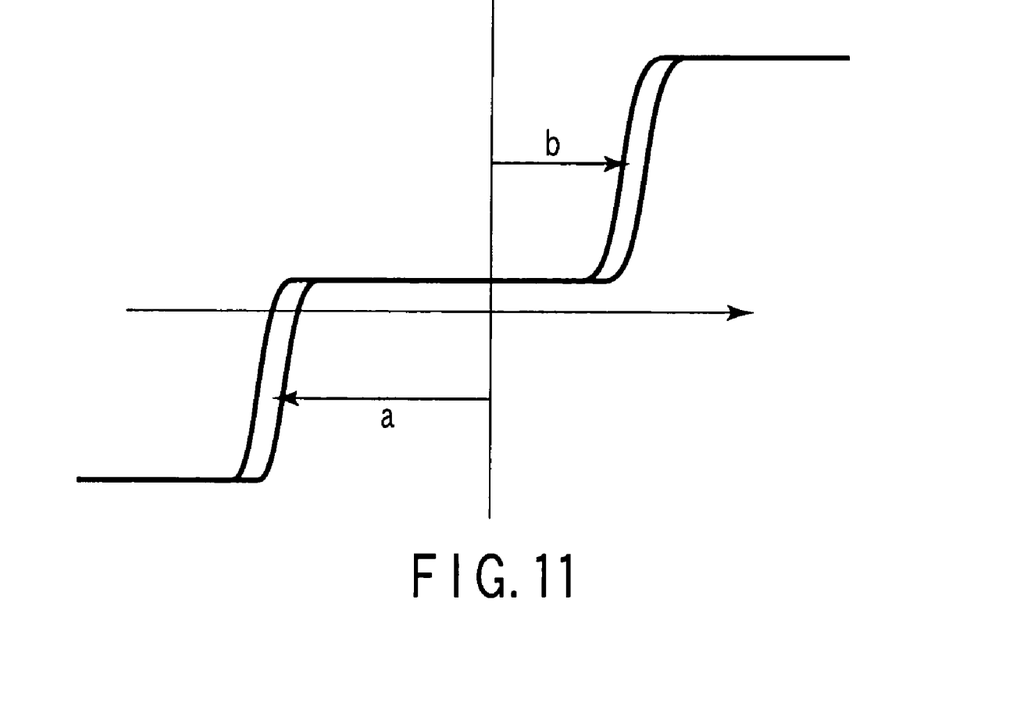
FIG. 11 is a graph schematically showing the results of measurements of the magnetostatic characteristics (magnetization curve) of a perpendicular magnetic recording media including a perpendicular recording film and soft underlayer.

The antiferromagnetic coupling force Hex_afc of the soft underlayer is obtained as follows. FIG. 11 schematically shows the results of measurements of the magnetostatic characteristics (magnetization curve) of a perpendicular magnetic recording media including a perpendicular recording film and a soft underlayer. Referring to FIG. 11, a represents the magnitude of a reversal field of an antiferromagnetically coupled upper soft magnetic layer of the soft underlayer, and b represents the magnitude of a reversal field of an antiferromagnetically coupled lower soft magnetic layer of the soft underlayer. A value half that of the magnetic field b shown in FIG. 11 is defined as the antiferromagnetic coupling force Hex_afc. Note that the antiferromagnetic coupling force Hex_afc is irrelevant to the presence or absence of a magnetization pinning layer.

Figure 12:
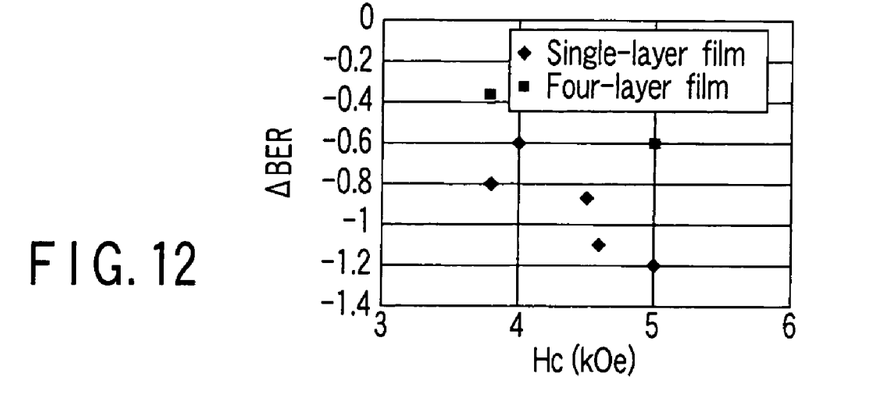
FIG. 12 is a graph showing the relationship between coercivity Hc of a media and the difference in BER between room temperature and a low temperature.

FIG. 12 shows the relationship between the coercivity Hc of the media and the difference in BER between room temperature and low temperatures. The BER decreases at low temperatures in any media, although the decrease more or less depends on the coercivity of each media. When the soft underlayer was a single-layer film of CoZrHb [120 nm], the decrease in BER at a low temperature was about an order of −1.2 in a media with Hc of 5 kOe. In contrast, when the antiferromagnetic coupling force was increased by using CoZrNb [60 nm]/Ru/Co/CoZrNb [60 nm] (indicated by "Four-layer film" in FIG. 12) as the soft underlayer, the decrease in BER at a lower temperature improved to about an order of −0.6 in the media with Hc of 5 kOe, because the overwrite characteristics OW improved.

As already described with reference to FIG. 6, the miserase rate abruptly rises when the MWW becomes smaller than 0.225 μm. To solve this problem, it is effective to increase the antiferromagnetic coupling force of the soft underlayer. This will be explained below.

Figure 13:
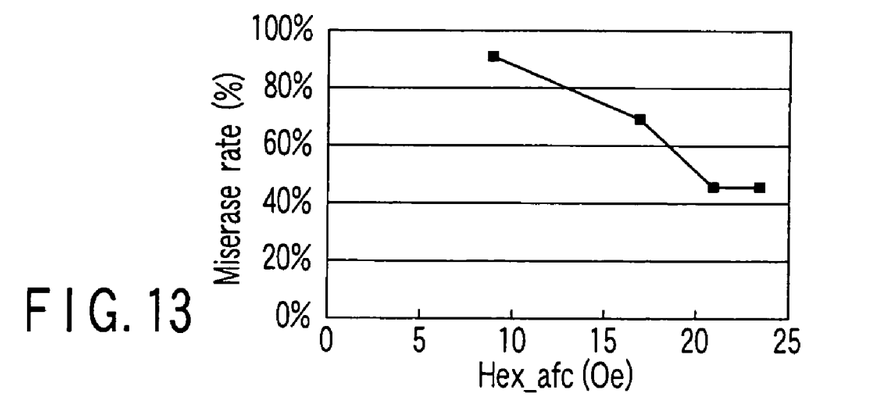
FIG. 13 is a graph showing the relationship between the antiferromagnetic coupling force of a soft underlayer of a media and the miserase rate when a main pole exhibiting MWW of 0.21 µm is used.

FIG. 13 shows the relationship between the antiferromagnetic coupling force of the soft underlayer of the media and the miserase rate when a main pole exhibiting MWW of 0.21 μm is used. As shown in FIG. 13, when the antiferromagnetic coupling force of the soft underlayer is increased, the miserase rate caused by remanent magnetization in the main pole is decreased. Note that the antiferromagnetic coupling force is desirably about 20 Oe or more, since the miserase rate saturates when the antiferromagnetic coupling force is about 20 Oe or more.

Figure 14:
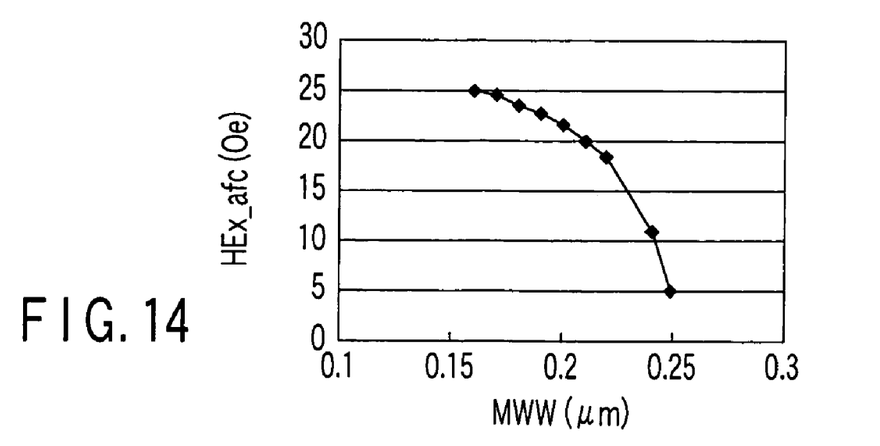
FIG. 14 is a graph showing the relationship between the MWW and the antiferromagnetic coupling force Hex_afc at which the miserase rate is saturated.

FIG. 14 shows the relationship between the MWW and the antiferromagnetic coupling force Hex_afc at which the miserase rate is saturated. FIG. 14 demonstrates that a perpendicular magnetic recording apparatus using a perpendicular double-layered media having a soft underlayer whose antiferromagnetic coupling force Hex_afc is present in a region above the curve shown in FIG. 14 can decrease the miserase rate and improve the overwrite characteristics. Accordingly, the Hex_afc and MWW need only satisfy the following relationship:

$$Hex\_afc > 1.6 * \ln((0.23 - MWW)^2 * 100)) + 25.6.$$

Two types of perpendicular double-layered media including soft underlayers different in Hex_afc were actually manufactured, and the occurrence of miserase and the overwrite characteristics of perpendicular magnetic recording apparatuses including these perpendicular double-layered media were evaluated.

Perpendicular double-layered media as shown in FIG. 2 were manufactured. A four-layer film of CoZrNb [60 nm]/Ru [0.8 nm]/Co/CoZrNb [60 nm] was used as the soft underlayer. CoCrPt—SiO$_2$ was used as the material of the perpendicular recording layer. The coercivity Hc of each of the two types of perpendicular double-layered media was 5 kOe. One perpendicular double-layered media had a Co layer with a thickness of about 5 Å and an antiferromagnetic coupling force Hex_afc of 15 Oe. The other perpendicular double-layered media had a Co layer with a thickness of about 20 Å and an antiferromagnetic coupling force Hex_afc of 23 Oe.

Two types of perpendicular magnetic recording apparatuses were manufactured by using each perpendicular double-layered media and a magnetic head having a main pole, exhibiting MWW of 0.21 µm, with saturation magnetic flux density Bs of 2.15 T.

As described previously, when a main pole whose MWW is 0.21 µm is used, the antiferromagnetic coupling force Hex_afc of the soft underlayer must be about 20 Oe or more in order to suppress miserase of information recorded on a media caused by remanent magnetization in the main pole.

In a perpendicular magnetic recording apparatus (Comparative Example) using the perpendicular double-layered media whose antiferromagnetic coupling force Hex_afc was 15 Oe, the overwrite characteristic value was 35 dB, and miserase of information recorded on the media occurred due to remanent magnetization in the main pole. By contrast, in a perpendicular magnetic recording apparatus (Example) using the perpendicular double-layered media whose antiferromagnetic coupling force Hex_afc was 23 Oe, no miserase of information recorded on the media caused by remanent magnetization in the main pole occurred. Also, the overwrite characteristic value of the perpendicular magnetic recording apparatus of Example was 37 dB, higher by 2 dB than that of the Comparative Example. Accordingly, this apparatus operated without any problems even at low temperatures.

Note that the media noise can be reduced by additionally forming a nonmagnetic underlayer between the soft underlayer and the perpendicular recording layer in the perpendicular double-layered media of Example. Note also that magnetization in the soft underlayer can be further stabilized by additionally forming an in-plane hard magnetic layer (pinning layer) between the substrate and the soft underlayer in the perpendicular double-layered media of Example.

Figure 15:
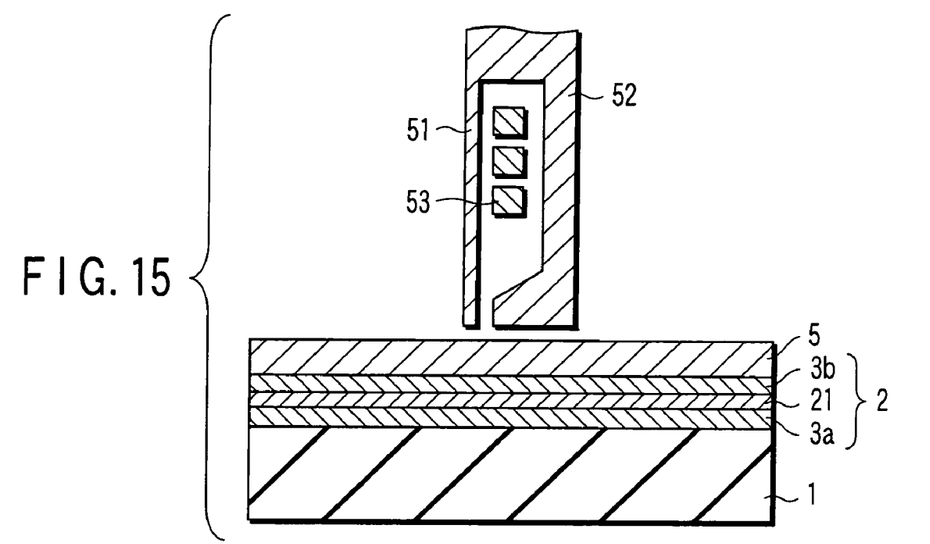
FIG. 15 is a sectional view showing a perpendicular magnetic recording apparatus according to the second embodiment of the present invention.

FIG. 15 shows a perpendicular magnetic recording apparatus according to the second embodiment of the present invention. A perpendicular double-layered media shown in FIG. 15 has a structure in which a soft underlayer 2 including a soft magnetic layer 3a, an antiferromagnetic layer 21 and another soft magnetic layer 3b, and a perpendicular recording layer 5 are stacked on a nonmagnetic substrate 1. The antiferromagnetic layer 21 is made of, e.g., an MnIr-based alloy, an MnFe-based alloy, NiMn, PtMn, PdPtMn, RhMn, CrMnPt, CrAl, TbCo, NiO, or Fe$_2$O$_3$. The antiferromagnetic layer 21 and each soft magnetic layer 3a, 3b are coupled with each other by exchange coupling. Similar to FIG. 1, a magnetic head shown in FIG. 15 includes a main pole 51, a return yoke 52, and an exciting coil 53.

In the perpendicular magnetic recording apparatus shown in FIG. 15, an exchange coupling force Hex_sw between the antiferromagnetic layer and soft magnetic layers can be considered in the same manner as for the antiferromagnetic coupling force described above. Therefore, there needs only satisfy the following formula:

$$Hex\_sw > 1.6 * \ln((0.23 - MWW)^2 * 100)) + 25.6.$$

Perpendicular magnetic recording media as modifications of FIG. 15 will be described below with reference to FIGS. 16 and 17.

Figure 16:
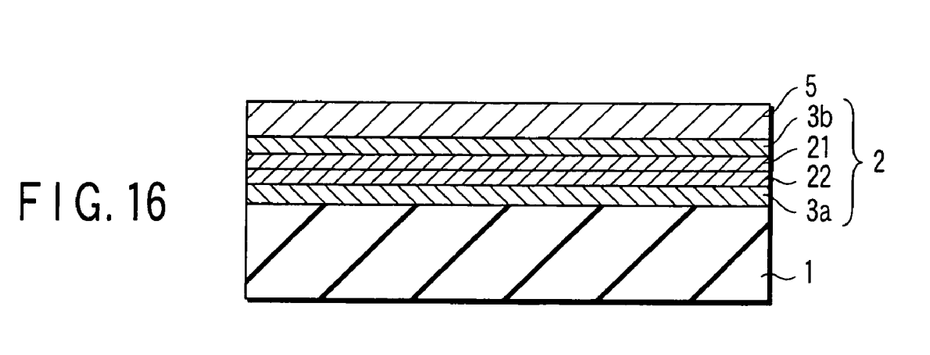
FIG. 16 is a sectional view showing a perpendicular magnetic recording media as a modification of FIG. 15.

A perpendicular magnetic recording media shown in FIG. 16 has a structure in which a soft underlayer 2 including a soft magnetic layer 3a, a soft magnetic underlayer 22, an antiferromagnetic layer 21 and another soft magnetic layer 3b, and a perpendicular recording layer 5 are stacked on a nonmagnetic substrate 1. NiFe or the like is used as the soft magnetic underlayer 22.

Figure 17:
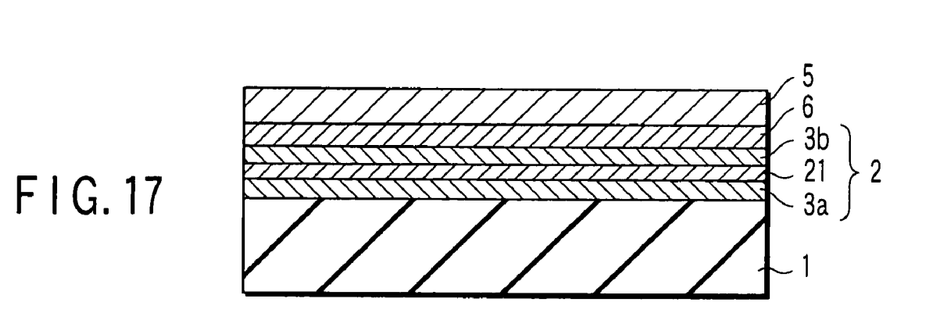
FIG. 17 is a sectional view showing a perpendicular magnetic recording media as a modification of FIG. 15.

A perpendicular magnetic recording media shown in FIG. 17 has a structure in which a soft underlayer 2 including a soft magnetic layer 3a, an antiferromagnetic layer 21 and another soft magnetic layer 3b, a nonmagnetic underlayer 6, and a perpendicular recording layer 5 are stacked on a nonmagnetic substrate 1. The perpendicular magnetic recording media shown in FIG. 17 differs from that shown in FIG. 15 in that the nonmagnetic underlayer 6 is formed between the soft underlayer 2 and the perpendicular recording layer 5. The media noise can be reduced by the nonmagnetic underlayer 6.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A perpendicular magnetic recording apparatus comprising:
    a perpendicular double-layered media comprising a substrate, a soft underlayer including a soft magnetic layer, an intermediate layer and another soft magnetic layer in which the two soft magnetic layers are antiferromagnetically coupled with each other, and a perpendicular recording layer; and
    a magnetic head comprising a main pole, a return yoke, and an exciting coil,
    wherein a relationship between an antiferromagnetic coupling force Hex_afc of the two soft magnetic layers included in the soft underlayer and a full width at half maximum MWW in a cross track direction when a low-frequency signal is recorded on the perpendicular recording layer by the magnetic head satisfies the following formula:

$$Hex\_afc > 1.6 * \ln((0.23 - MWW)^2 * 100)) + 25.6.$$

2. The apparatus according to claim 1, wherein the intermediate layer is Ru.

3. The apparatus according to claim 1, wherein the intermediate layer is a stack of Ru and Co.

4. The apparatus according to claim 1, further comprising a nonmagnetic underlayer between the soft underlayer and the perpendicular recording layer.

5. The apparatus according to claim 1, further comprising a magnetization pinning layer between the substrate and the soft underlayer.

6. The apparatus according to claim 5, wherein the magnetization pinning layer is an in-plane hard magnetic layer.

7. The apparatus according to claim 6, wherein the in-plane hard magnetic layer is selected from the group consisting of CoCrPtB, CoSm, and CoPt.

8. The apparatus according to claim 6, further comprising a magnetic or nonmagnetic layer having saturation magnetization smaller than that of the in-plane hard magnetic layer between the in-plane hard magnetic layer and the soft underlayer.

9. A perpendicular magnetic recording apparatus comprising:

a perpendicular double-layered media comprising a substrate, a soft underlayer including a soft magnetic layer, an antiferromagnetic layer and another soft magnetic layer in which each soft magnetic layer and the antiferromagnetic layer are coupled with each other by exchange coupling, and the two soft magnetic layers are not coupled, and a perpendicular recording layer; and a magnetic head comprising a main pole, a return yoke, and an exciting coil, wherein a relationship between an exchange coupling force Hex_sw between the soft magnetic layers and the antiferromagnetic layer included in the soft underlayer and a full width at half maximum MWW in a cross track direction when a low-frequency signal is recorded on the perpendicular recording layer by the magnetic head satisfies the following formula:

$$Hex\_sw > 1.6 * \ln((0.23 - MWW)^2 * 100)) + 25.6.$$

10. The apparatus according to claim 9, wherein the antiferromagnetic layer is selected from the group consisting of an MnIr-based alloy, an MnFe-based alloy, NiMn, PtMn, PdPtMn, RhMn, CrMnPt, CrAl, TbCo, NiO, and $Fe_2O_3$.

11. The apparatus according to claim 9, further comprising a soft magnetic underlayer under the antiferromagnetic layer.

12. The apparatus according to claim 11, wherein the soft magnetic underlayer is NiFe.

13. The apparatus according to claim 9, further comprising a nonmagnetic underlayer between the soft underlayer and the perpendicular recording layer.

* * * * *